United States Patent
Joglekar (10) Patent No.: US 8,112,071 B2
(45) Date of Patent: *Feb. 7, 2012

(54) SYSTEM AND METHOD FOR CONNECTING TO AN AUDIO CONFERENCE SERVICE USING A MOBILE COMMUNICATIONS DEVICE

(75) Inventor: Manohar A. Joglekar, Ottawa (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,426

(22) Filed: Dec. 9, 2010

(65) Prior Publication Data

US 2011/0081896 A1 Apr. 7, 2011

Related U.S. Application Data (63) Continuation of application No. 11/217,010, filed on Aug. 31, 2005, now Pat. No. 7,894,805.

(51) Int. Cl.
*H04M 3/42* (2006.01)

(52) U.S. Cl. ............. 455/416; 379/202.01; 379/204.01; 379/207.11; 370/260; 370/261; 709/204; 348/14.08

(58) Field of Classification Search ............... 455/414.1, 455/415–417, 466, 550.1, 556.2, 566, 567; 379/202.01–206.01, 207.11; 709/204, 205; 370/259–266; 348/14.08, 14.09, 14.1

See application file for complete search history.

(56) References Cited

U.S. PATENT DOCUMENTS

| 6,442,396 | B1 | 8/2002 | Schmidt et al. |
| 6,628,767 | B1 | 9/2003 | Wellner et al. |
| 6,665,392 | B1 | 12/2003 | Wellner et al. |
| 6,747,970 | B1 | 6/2004 | Lamb et al. |
| 7,162,025 | B2 * | 1/2007 | Schnurr ................ 379/355.07 |
| 7,209,947 | B1 * | 4/2007 | Lee et al. ................ 709/204 |
| 7,792,262 | B2 | 9/2010 | Parker |
| 2002/0091769 | A1 | 7/2002 | Drozdzewicz et al. |
| 2002/0137470 | A1 * | 9/2002 | Baron et al. ................ 455/79 |
| 2005/0014490 | A1 | 1/2005 | Desai et al. |
| 2005/0018827 | A1 | 1/2005 | Himmel et al. |
| 2005/0227680 | A1 | 10/2005 | Snowdon |
| 2005/0238156 | A1 | 10/2005 | Turner |
| 2005/0287998 | A1 | 12/2005 | Tonouchi |

(Continued)

FOREIGN PATENT DOCUMENTS

CA 2324187 5/2001

OTHER PUBLICATIONS

CIPO, Office Action, Application No. 2,558,295, Mar. 4, 2009, 2 pgs.

(Continued)

*Primary Examiner* — Anthony Addy
(74) *Attorney, Agent, or Firm* — The Danamraj Law Group, P.C.

(57) ABSTRACT

A mobile communications device for connecting to a conference call hosted by an audio conference service. After receiving a meeting invitation and storing information relating thereto, the mobile communications device dials a first sequence contained in a first link to connect to the audio conference service and, subsequent to dialing the first sequence, dials a second sequence contained in a second link associated with the first link to connect to the conference call.

17 Claims, 7 Drawing Sheets

U.S. PATENT DOCUMENTS

2007/0111716 A1    5/2007    Leigh et al.
2007/0280464 A1*   12/2007   Hughes et al. ........... 379/205.01
2008/0080692 A1*   4/2008    Sylvain ................... 379/202.01

OTHER PUBLICATIONS

CIPO, Office Action, Application No. 2,558,295, Mar. 16, 2010, 2 pgs.
CIPO, Office Action, Application No. 2,558,295, Mar. 31, 2011, 3 pgs.
EPO, Search Report, Application No. 05255314.6, Feb. 9, 2006, 4 pgs.
EPO, Communication Pursuant to Article 94(3) EPC, Application No. 05255314.6, Feb. 22, 2006, 4 pgs.
USPTO, Office Action, Application No. 11/217,010, Sep. 25, 2007, 12 pgs.
USPTO, Office Action, Application No. 11/217,010, Mar. 26, 2008, 12 pgs.
USPTO, Advisory Action, Application No. 11/217,010, Jul. 30, 2008, 3 pgs.
USPTO, Office Action, Application No. 11/217,010, Nov. 12, 2008, 11 pgs.
USPTO, Office Action, Application No. 11/217,010, Apr. 28, 2009, 12 pgs.
USPTO, Office Action, Application No. 11/217,010, Oct. 19, 2009, 12 pgs.
USPTO, Office Action, U.S. Appl. No. 11/217,010, Apr. 29, 2010, 11 pgs.
USPTO, Notice of Allowance, U.S. Appl. No. 11/217,010, Oct. 15, 2010, 10 pgs.
EPO, Communication Pursuant to Article 96(3) EPC, Application No. 052553146, Oct. 6, 2011, 4 pgs.

* cited by examiner

SYSTEM AND METHOD FOR CONNECTING TO AN AUDIO CONFERENCE SERVICE USING A MOBILE COMMUNICATIONS DEVICE

PRIORITY UNDER 35 U.S.C. §120 & 37 C.F.R. §1.78

This nonprovisional application is a continuation application claiming the benefit of the following prior United States patent application entitled: "SYSTEM AND METHOD FOR CONNECTING TO AN AUDIO CONFERENCE SERVICE USING A MOBILE COMMUNICATIONS DEVICE", filed Aug. 31, 2005, application Ser. No. 11/217,010, which is hereby incorporated by reference.

TECHNICAL FIELD OF THE APPLICATION

The present disclosure relates, in general, to mobile communications devices and, in particular, to a system and method for facilitating connection of a mobile communications device to an audio conference service.

BACKGROUND

In the business world, situations frequently arise in which a physical meeting between geographically separated parties would be appropriate, but the expenses associated with bringing those parties together are too high to make such a meeting practical. In these situations, teleconferencing provides a convenient, low-cost way for those parties to conduct a meeting via telephone. Teleconferencing may also be useful in situations in which the number of participants in the meeting exceeds the available meeting space or in which gathering all of the participants in a single location is inefficient or undesirable for some reason.

There are many commercial audio conference services currently available. Typically, a person who has been invited to participate in a teleconference will be given a telephone number for connecting to a designated audio conference system and an access code or password to gain access to the teleconference. Accordingly, the participant first dials the telephone number and then, typically in response to a prompt, dials the access code/password to join in the conference without requiring operator intervention. Often, the audio conference service phone number and access code/password will be contained in links included in a meeting invitation comprising a text message, such as an email message or calendar entry, which may be viewed by the participant on a communications device, such as a mobile communications device ("MCD").

Currently, a user can easily dial the phone number by clicking on the link in the text message that contains the phone number; however, the user is required manually to enter the access code/password for the particular conference call when so prompted. Accordingly, the user must either have written down or memorized the code prior to initiating the call to the service or must, when prompted, switch the active screen from a Phone User Interface ("PUI") to the application that contains the access code/password, write down or memorize it, and switch back to the PUI to manually dial the access code/password.

BRIEF DESCRIPTION OF THE DRAWINGS

For a more complete understanding of the features and advantages of the present method and mobile device, reference is now made to the detailed description along with the accompanying figures in which corresponding numerals in the different figures refer to corresponding parts and in which.

DETAILED DESCRIPTION OF THE DRAWINGS

It would be desirable for a participant in a teleconference to be able to initiate such dialing of both the phone number and access code/password directly from the text in which that information is contained. Accordingly, a need has arisen for a system and method for facilitating connection of a communications device to an audio conference service.

One embodiment is a method of operating a communications device for connecting to a conference call hosted by an audio conference service. The method comprises dialing a first sequence contained in a first link, and, subsequent to dialing the first sequence, dialing a second sequence contained in a second link associated with the first link. The first and second links are included in an application page comprising, for example, a calendar page, an email message page, or a text message page, presented on a display of the communications device. The first sequence comprises a telephone number of the audio conference service and the second sequence comprises an access code associated with the conference call.

Another embodiment is a system for facilitating connection of a communications device to a conference call hosted by an audio conference service. The system comprises means for dialing a first sequence contained in a first link, and means for dialing a second sequence contained in a second link selected by a user subsequent to the dialing of the first sequence.

Another embodiment is a method for connecting to a conference call hosted by an audio conference service using a mobile communications device ("MCD"). The method comprises, responsive to user selection of a first link containing a phone number for the audio conference service, dialing the phone number, and, responsive to user selection of a second link containing an access code for the conference call and subsequent to the dialing of the phone number, dialing the access code.

While various embodiments of a mobile communications device operating within a network system are discussed in detail below, it should be appreciated that the present disclosure provides many applicable inventive concepts which can be embodied in a wide variety of specific contexts. The specific embodiments discussed herein are merely illustrative of specific ways to use the mobile communications device within the network system, and do not delimit the scope of the present disclosure.

Figure 1:
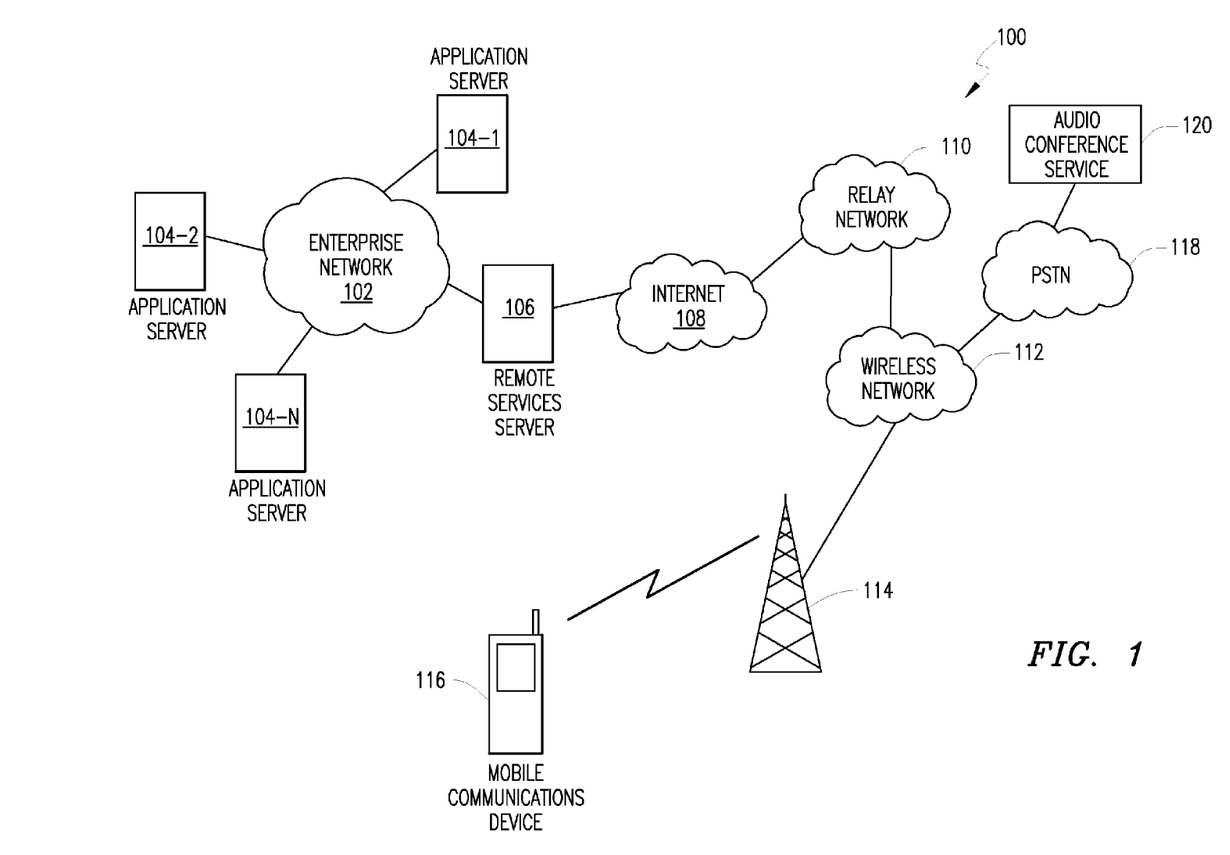
FIG. 1 depicts an exemplary network environment including a wireless packet data service network wherein an embodiment of the present method may be practiced.

Referring now to the drawings, and more particularly to FIG. 1, depicted therein is an exemplary network environment 100 including a wireless packet data service network 112 wherein an embodiment of the present disclosure may be practiced. An enterprise network 102, which may be a packet-switched network, can include one or more geographic sites and be organized as a local area network (LAN), wide area network (WAN) or metropolitan area network (MAN), et cetera, for serving a plurality of corporate users. A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-i, i=1, 2, . . . , N, with respect to the services supported in the enterprise network 102.

Additionally, a remote services server 106 may be interfaced with the enterprise network 102 for enabling a corporate user to access or effectuate any of the services from a remote location using a suitable mobile communications device (MCD) 116. A secure communication link with end-to-end encryption may be established that is mediated through an external IP network, i.e., a public packet-switched network such as the Internet 108, as well as the wireless packet data service network 112 operable with MCD 116 via suitable wireless network infrastructure that includes a base station (BS) 114. In one embodiment, a trusted relay network 110 may be disposed between the Internet 108 and the infrastructure of wireless packet data service network 112. By way of example, MCD 116 may be a data-enabled handheld device capable of receiving and sending messages, web browsing, interfacing with corporate application servers, et cetera.

Additionally, a conventional public switched telephone network ("PSTN") 118 may also be connected to the wireless network 112 for enabling audio communications between the MCD 116 and an audio conference service 120 as will be described in greater detail below.

For purposes of the present disclosure, the wireless packet data service network 112 may be implemented in any known or heretofore unknown mobile communications technologies and network protocols, as long as a packet-switched data service is available therein for transmitting packetized information. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, or any $3^{rd}$ Generation (3G) network. By way of providing an exemplary embodiment, the teachings of the present disclosure will be illustrated with a GPRS-based carrier network, although those skilled in the art should readily recognize that the scope of the present disclosure is not limited thereby.

Figure 2:
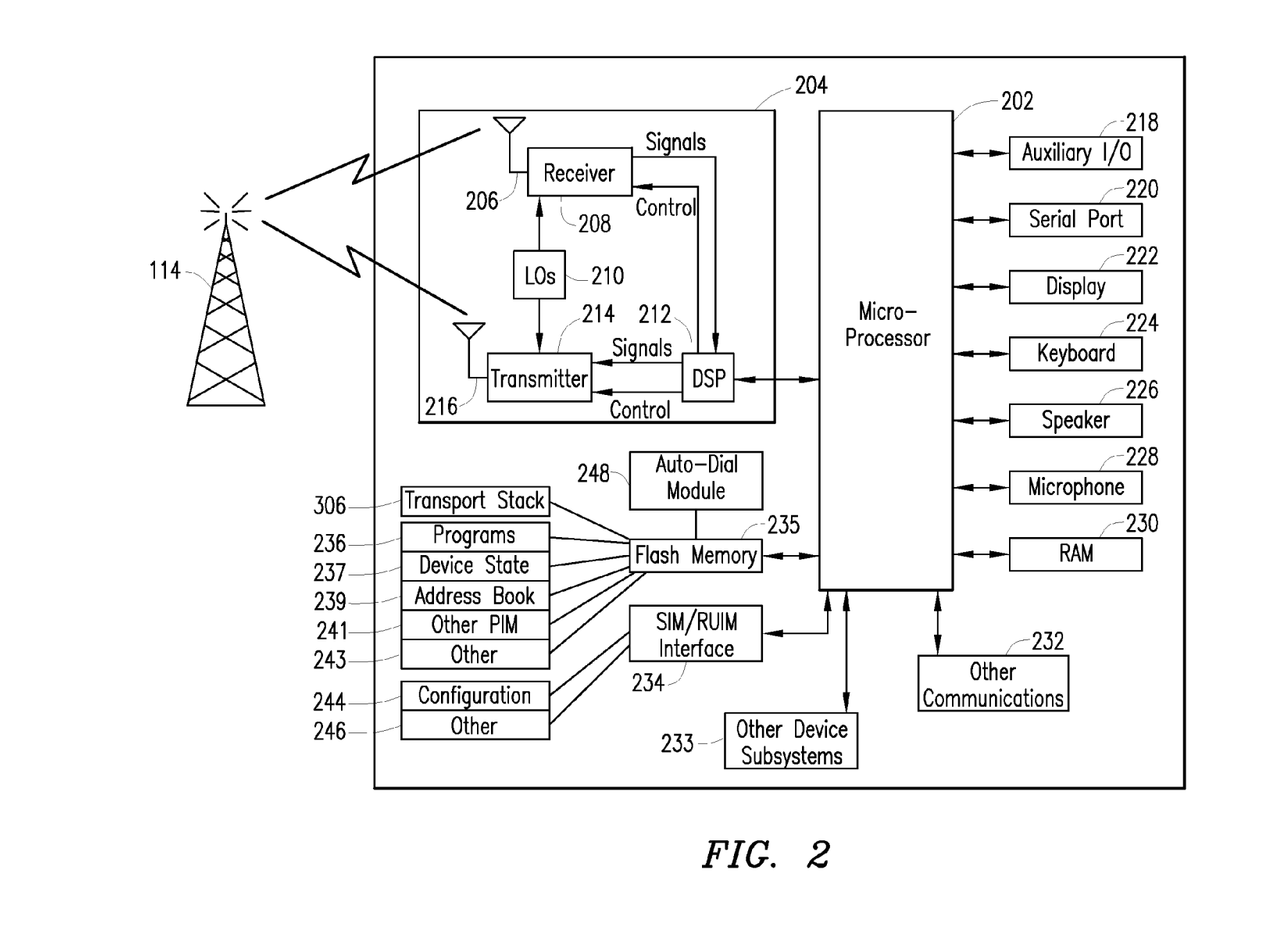
FIG. 2 depicts a block diagram of a mobile communications device according to one embodiment of the present disclosure.

FIG. 2 depicts a block diagram of a mobile communications device operable to connect to an audio conference service according to one embodiment. It will be recognized by those skilled in the art upon reference hereto that although an embodiment of MCD 116 may comprise an arrangement similar to one shown in FIG. 2, there can be a number of variations and modifications, in hardware, software or firmware, with respect to the various modules depicted. Accordingly, the arrangement of FIG. 2 should be taken as illustrative rather than limiting with respect to the embodiments of the present disclosure. A microprocessor 202 providing for the overall control of an embodiment of MCD 116 is operably coupled to a communication subsystem 204 which includes a receiver 208 and transmitter 214 as well as associated components such as one or more local oscillator (LO) modules 210 and a processing module such as a digital signal processor (DSP) 212. As will be apparent to those skilled in the field of communications, the particular design of the communication module 204 may be dependent upon the communications network with which the mobile device is intended to operate. In one embodiment, the communication module 204 is operable with both voice and data communications. Regardless of the particular design, however, signals received by antenna 206 through BS 114 are provided to receiver 208, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 212, and provided to transmitter 214 for digital-to-analog (D/A) conversion, frequency up conversion, filtering, amplification and transmission over the air-radio interface via antenna 216.

Microprocessor 202 also interfaces with further device subsystems such as auxiliary input/output (I/O) 218, serial port 220, display 222, keyboard 224, speaker 226, microphone 228, random access memory (RAM) 230, a short-range communications subsystem 232, and any other device subsystems generally labeled as reference numeral 233. To control access, a Subscriber Identity Module (SIM) or Removable User Identity Module (RUIM) interface 234 is also provided in communication with the microprocessor 202. In one implementation, SIM/RUIM interface 234 is operable with a SIM/RUIM card having a number of key configurations 244 and other information 246 such as identification and subscriber-related data.

Operating system software and transport stack software may be embodied in a persistent storage module (i.e., non-volatile storage) such as Flash memory 235. In one implementation, Flash memory 235 may be segregated into different areas, e.g., storage area for computer programs 236 as well as data storage regions such as device state 237, address book 239, other personal information manager (PIM) data 241, and other data storage areas generally labeled as reference numeral 243. Additionally, an auto-dial module 248 may be provided as part of the persistent storage for facilitating connection of the MCD 116 to an audio conference service, such as the service 120, in accordance with the teachings of the present disclosure as will be described in greater detail below, specifically, in FIGS. 4, 5, 6A, and 6B.

Figure 3:
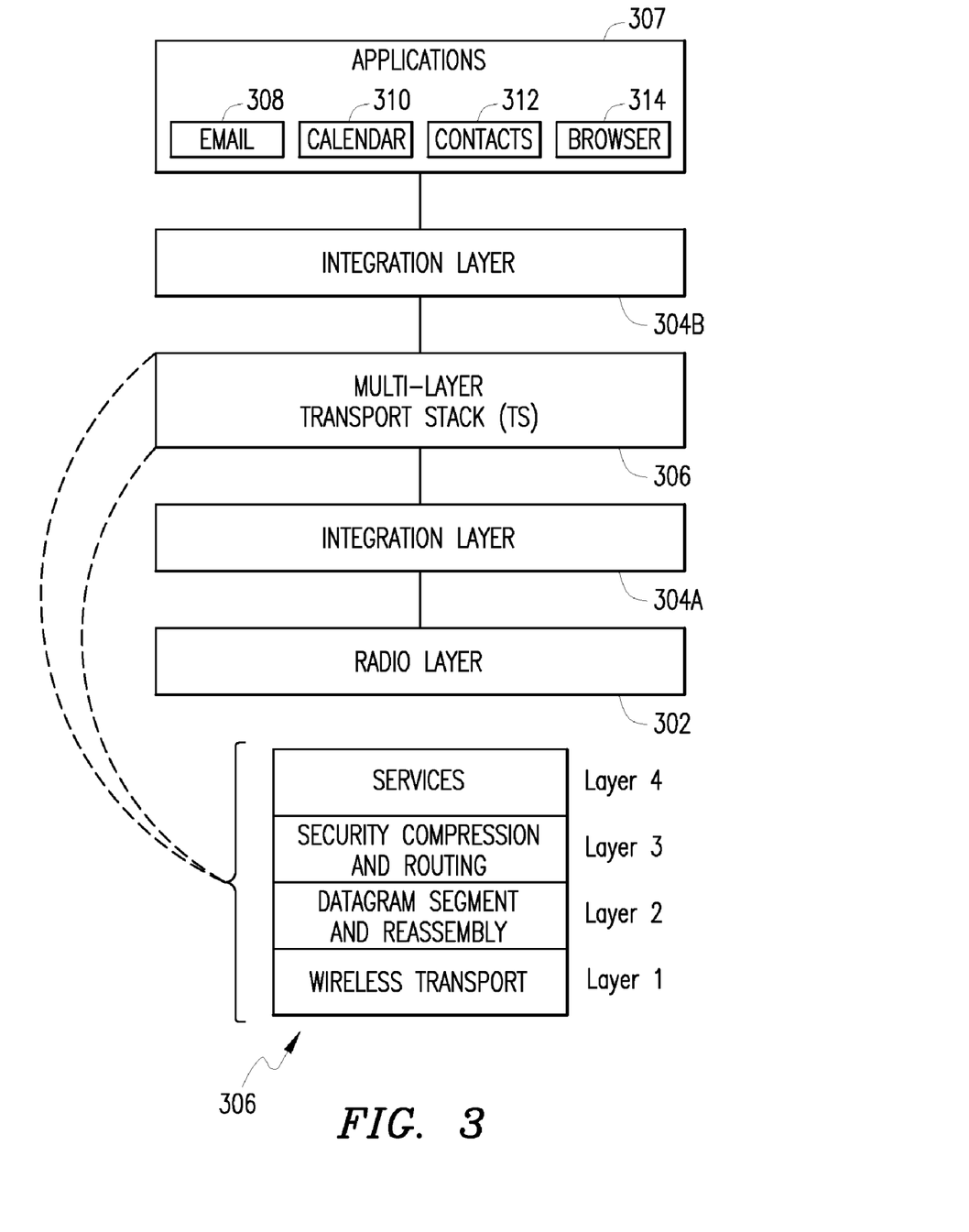
FIG. 3 depicts a software architectural view of a mobile communications device according to one embodiment of the present disclosure.

FIG. 3 depicts a software architectural view of a mobile communications device according to one embodiment. A multi-layer transport stack (TS) 306 is operable to provide a generic data transport protocol for any type of corporate data, including email, via a reliable, secure and seamless continuous connection to a wireless packet data service network. An integration layer 304A is operable as an interface between the MCD's radio layer 302 and the transport stack 306. Likewise, another integration layer 304B is provided for interfacing between the transport stack 306 and the user applications 307 supported on the MCD, e.g., email 308, calendar/scheduler 310, contact management 312 and browser 314. Although not specifically shown, the transport stack 306 may also be interfaced with the MCD's operating system. In another implementation, the transport stack 306 may be provided as part of a data communications client module operable as a host-independent virtual machine on a mobile device.

The bottom layer (Layer 1) of the transport stack 306 is operable as an interface to the wireless network's packet layer. Layer 1 handles basic service coordination within the exemplary network environment 100 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

Figure 4:
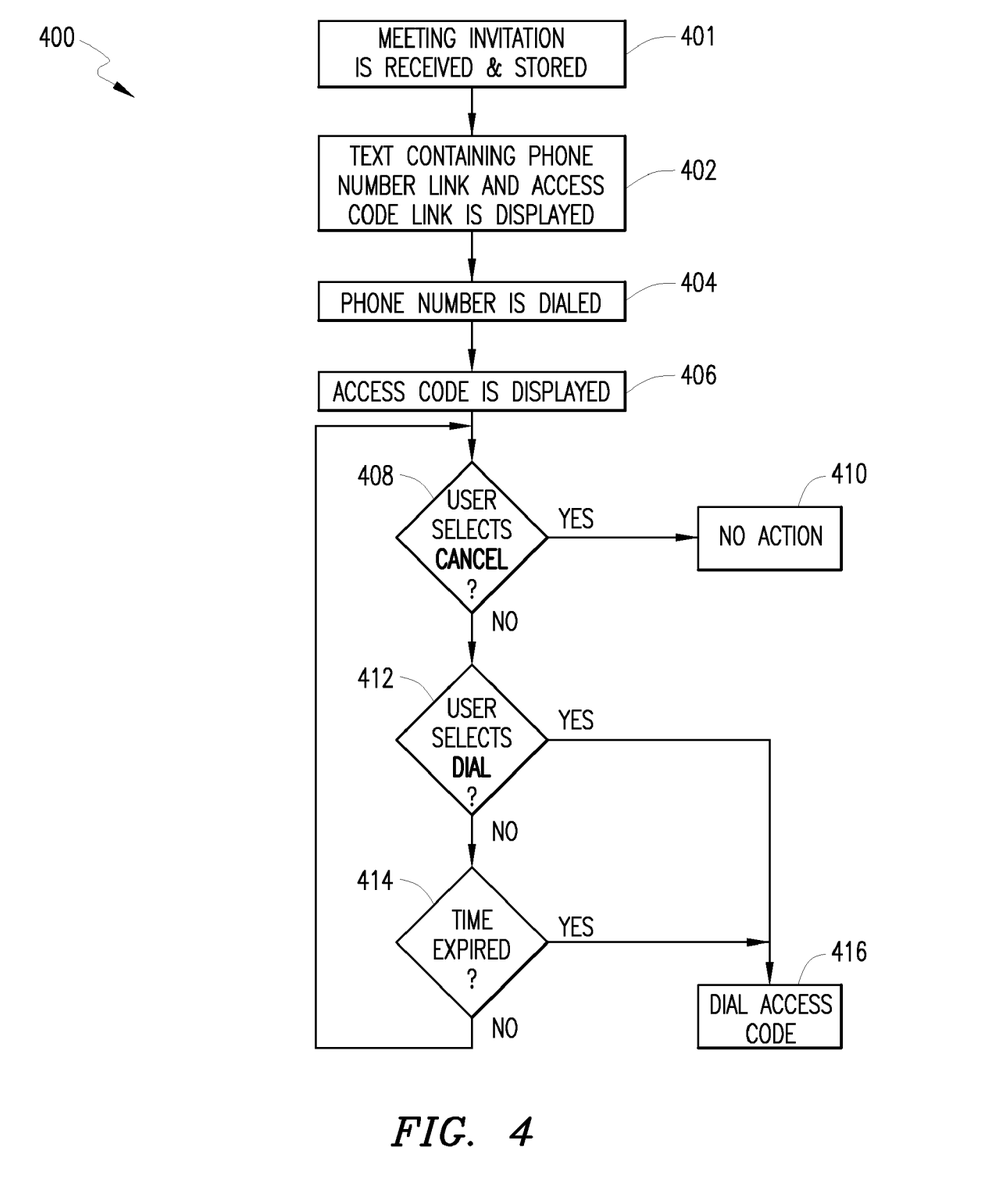
FIG. 4 depicts a flowchart of an embodiment for connecting a mobile communications device to an audio conference service.

FIG. 4 depicts a flowchart of an embodiment for facilitating connection of an MCD to a conference call hosted by an audio conference service. In the embodiment illustrated in method 400 of FIG. 4, a meeting invitation containing a phone number link and an access code link is received by the user of the MCD and stored in the memory thereof (block 401). For example, the meeting invitation may be contained in an email from the meeting sponsor or in a calendar entry. At or near the time that the meeting is scheduled, the user of the MCD opens an application page including the text containing a link comprising a telephone number to an audio conference service and a link comprising an access code/password for a conference call is displayed on the MCD (block 402). The application may be, for example, an e-mail application, calendar application, or memo pad application.

In one embodiment, an automatic reminder is presented to the user immediately prior to the scheduled meeting time. The reminder may comprise displaying a popup or dialog box prompting the user to open the aforementioned application page containing the telephone number and access code or may comprise displaying the application page itself. Preferably, the user is given the option of disabling the automatic reminder for a particular meeting, as well as the option of specifying the timing of the reminder relative to the meeting time.

Responsive to the user selecting the phone number link, the phone number is dialed by the MCD 116 via a phone user interface ("PUI") page (block 404). Subsequent to the dialing of the phone number, the PUI displays the access code (block 406), which has been previously associated with the phone number, e.g., by the user's selection of both the phone number link and the access code link in the meeting invitation.

If the user selects a "CANCEL" option (e.g., by selection of a CANCEL button) in response to display of the access code (block 408), no further action is taken (block 410). If the user selects a "DIAL" option (e.g., by selection of a DIAL button) in response to display of the access code (block 412), the access code will be dialed (block 416). It will be recognized that user-selection of the DIAL option will typically be in response to a prompt from the audio conference service 120 to enter the access code. If a predetermined time period expires prior to the user selecting either the CANCEL or the DIAL option (block 414), the access code will be dialed by the MCD 116 via the PUI page (block 416). The predetermined time period will presumably be long enough to allow for issuance of the access code prompt by the audio conference service 120.

Figure 5:
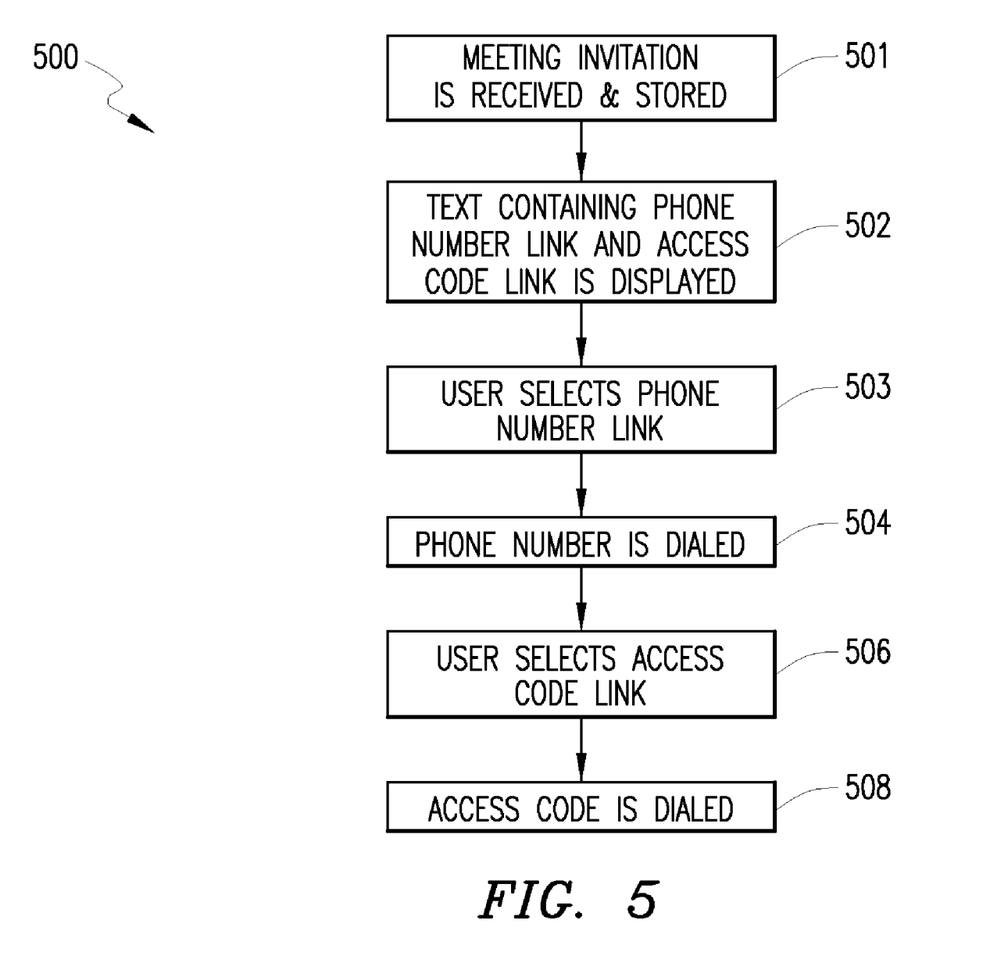
FIG. 5 depicts a flowchart of an alternative embodiment for connecting a mobile communications device to an audio conference service.

FIG. 5 depicts a flowchart of an alternative embodiment for facilitating connection of an MCD with an audio conference service. In the embodiment illustrated in method 500 of FIG. 5, a meeting invitation containing a phone number link and an access code link is received by the user of the MCD and stored in the memory thereof (block 501). For example, the meeting invitation may be contained in an email from the meeting sponsor or in a calendar entry. At or near the time that the meeting is scheduled, the user of the MCD opens an application page including the text containing a link comprising a telephone number to an audio conference service and a link comprising an access code/password for a conference call is displayed on the MCD (block 502). The application may be, for example, an e-mail application, calendar application, or memo pad application. The links will typically be provided in an invitation to join a conference call.

As previously noted, in one embodiment, an automatic reminder is presented to the user immediately prior to the scheduled meeting time. The reminder may comprise displaying a popup or dialog box prompting the user to open the aforementioned application page containing the telephone number and access code or may comprise displaying the application page itself. Preferably, the user is given the option of disabling the automatic reminder for a particular meeting, as well as the option of specifying the timing of the reminder relative to the meeting time.

Responsive to the user selecting the phone number link, the phone number is dialed by the MCD 116 via a phone user interface ("PUI") page (block 504). Subsequent to the dialing of the phone number and responsive to receipt of a prompt from the audio conference service to enter the access code, the user selects the access code link from the application page (block 506). This will require the user to switch from the PUI page to the application page to display the access code link. Responsive to selection of the access code link, the access code is dialed by the MCD 116 via the PUI page (block 508).

Figure 6A:
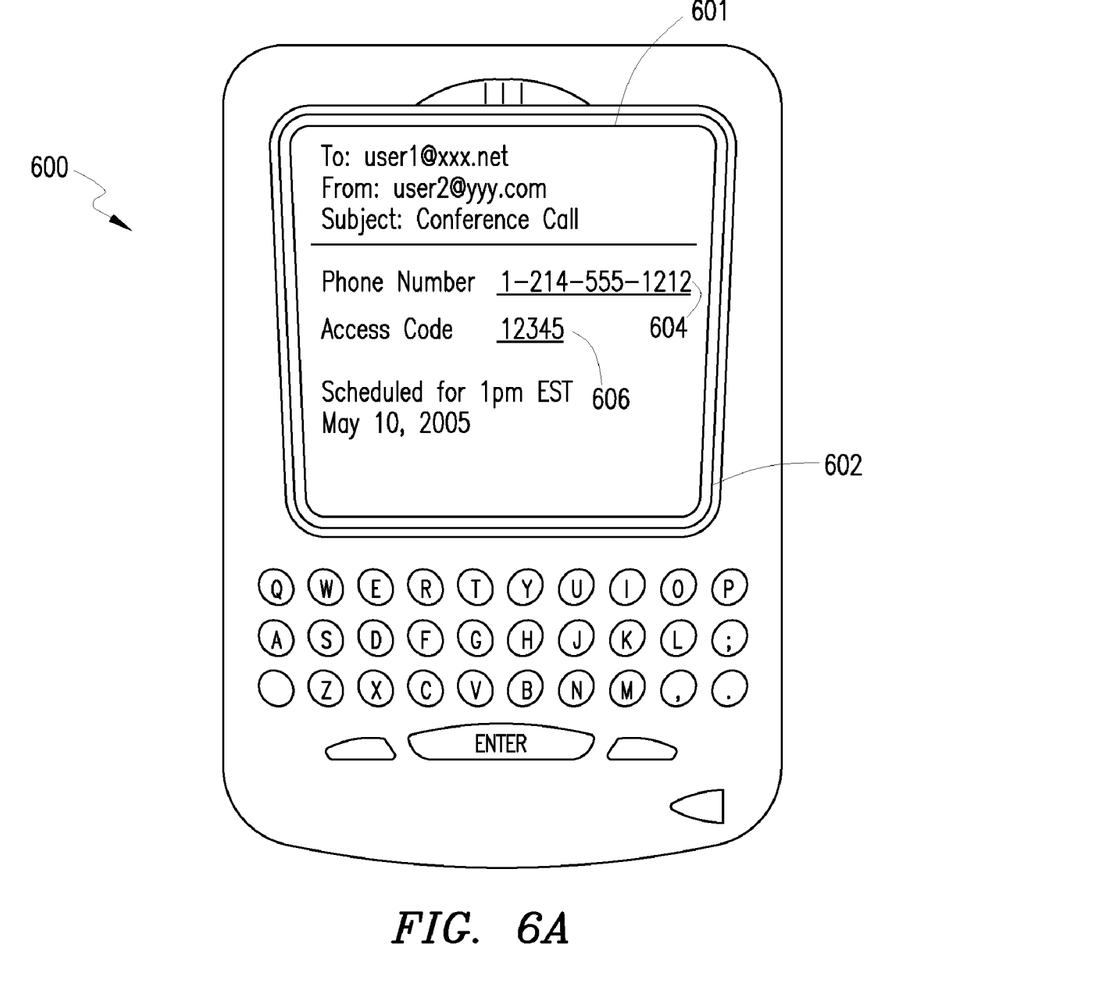
FIGS. 6A and 6B depict a mobile communications device in which the embodiments described herein are implemented.
Figure 6B:
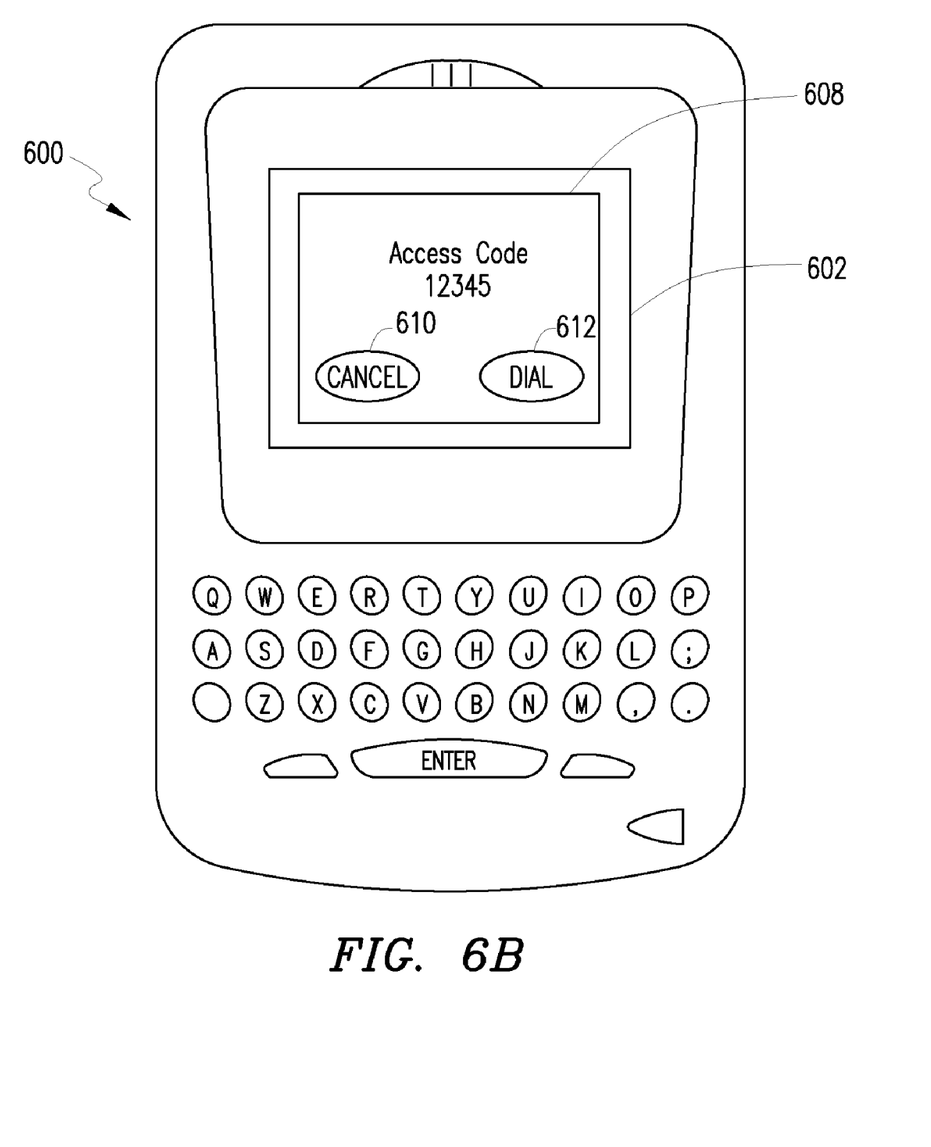

FIGS. 6A-6B depict an MCD 600 for implementing the above-described embodiments. In particular, FIG. 6A depicts the appearance of an email message 601 presented on a display 602 of the MCD 600. The email message 601 comprises an invitation to join a conference call and includes a link 604 comprising an audio conference service telephone number and a link 606 comprising an access code for the conference call. As previously described, selection of the link 602 in any manner recognized by the MCD 600 results in the audio conference service phone number being dialed.

After dialing of the audio conference service phone number has been completed, in one embodiment, the access code contained in the link 606 is displayed in a PUI page 608, as depicted in FIG. 6B. As described in detail above in connection with the method 400, selection of a CANCEL button 610 results in no action being taken and selection of a DIAL button 612 results in the access code being dialed. Alternatively, the access code will automatically be dialed after expiration of a predetermined time period if neither button 610, 612, is selected.

In another alternative, as described in detail above in connection with the method 500, in response to the prompt from the audio conference service, the user switches back to the display of the email 601 (FIG. 6A) and selects the link 606 to dial the access code.

While this disclosure has described a mobile communications device operating within a network system with reference to illustrative embodiments, this description is not intended to be construed in a limiting sense. Various modifications and combinations of the illustrative embodiments as well as other embodiments, will be apparent to persons skilled in the art upon reference to the description. It is, therefore, intended that the appended claims encompass any such modifications or embodiments.

What is claimed is:

1. A method of operating a communications device for connecting to a conference call having a telephone number and an access code, and hosted by an audio conference service, the method comprising:
    displaying an application page comprising text having a telephone number link for the conference call and an access code link for the conference call;
    dialing, in response to the user's selection of the telephone number link, a first sequence comprising the telephone number for the conference call;
    subsequent to dialing the first sequence, receiving input from the user to return to the displayed application page for selection of the access code link; and
    in response to the user's selection of the access code link, dialing a second sequence comprising the access code for the conference call.

2. The method as recited in claim 1 wherein the telephone number link and the access code link are included in the application page received at the communications device.

3. The method as recited in claim 1 further comprising, prior to dialing the first sequence, detecting selection by a user of the telephone number link.

4. The method as recited in claim 3 further comprising, prior to dialing the second sequence, detecting selection by a user of the access code link.

5. The method as recited in claim 1 further comprising, subsequent to dialing the first sequence and prior to dialing the second sequence, prompting the user to initiate dialing of the second sequence.

6. The method as recited in claim 5 wherein the dialing the second sequence is performed responsive to the user responding to the prompting in an affirmative manner.

7. The method as recited in claim 5 wherein the dialing the second sequence is performed in response to expiration of a predetermined period of time without the user responding to the prompting.

8. The method as recited in claim 1 wherein the application page is selected from a calendar application page, an email message page and a text message page.

9. The method as recited in claim 1 further comprising receiving a prompt from the audio conference service to enter an access code prior to dialing the second sequence.

10. A mobile communications device for connecting to a conference call having a telephone number and an access code, and hosted by an audio conference service, the mobile communications device comprising:
    a component configured to receive a meeting invitation from an application that can comprise any of a calendar application, a text message application and a memo pad application, the meeting invitation having text containing a telephone number link and an access code link for the conference call;
    a component configured to display the telephone number link;
    a component configured to dial, in response to the user's selection of the telephone number link, a first sequence comprising the telephone number for the conference call;
    a component configured to display the access number link in response to dialing the first sequence; and
    a component configured to dial, in response to the user's selection of the access code link, a second sequence comprising the access code for the conference call.

11. The mobile communications device as recited in claim 10 wherein the telephone number link and the access code link are included in an application page presented on a display.

12. The mobile communications device as recited in claim 10 further comprising a component configured to detect selection by the user of the telephone number link prior to the dialing of the first sequence.

13. The mobile communications device as recited in claim 10 further comprising a component configured to detect selection by the user of the access number link prior to the dialing of the second sequence.

14. The mobile communications device as recited in claim 10 further comprising a component configured to prompt the user to initiate dialing of the second sequence subsequent to the dialing of the first sequence and prior to the dialing of the second sequence.

15. The mobile communications device as recited in claim 14 wherein the component configured to dial the second sequence is responsive to the user responding to the prompting in an affirmative manner.

16. The mobile communications device as recited in claim 14 wherein the component configured to dial the second sequence is responsive to expiration of a predetermined period of time without the user responding to the prompting.

17. The mobile communications device as recited in claim 10 further comprising a component configured to receive a prompt from the audio conference service to enter the access code prior to dialing the second sequence.

* * * * *